C. E. SULLIVAN.
SAFETY HORSE HITCHING DEVICE.
APPLICATION FILED JAN. 24, 1913.
1,072,671.
Patented Sept. 9, 1913.
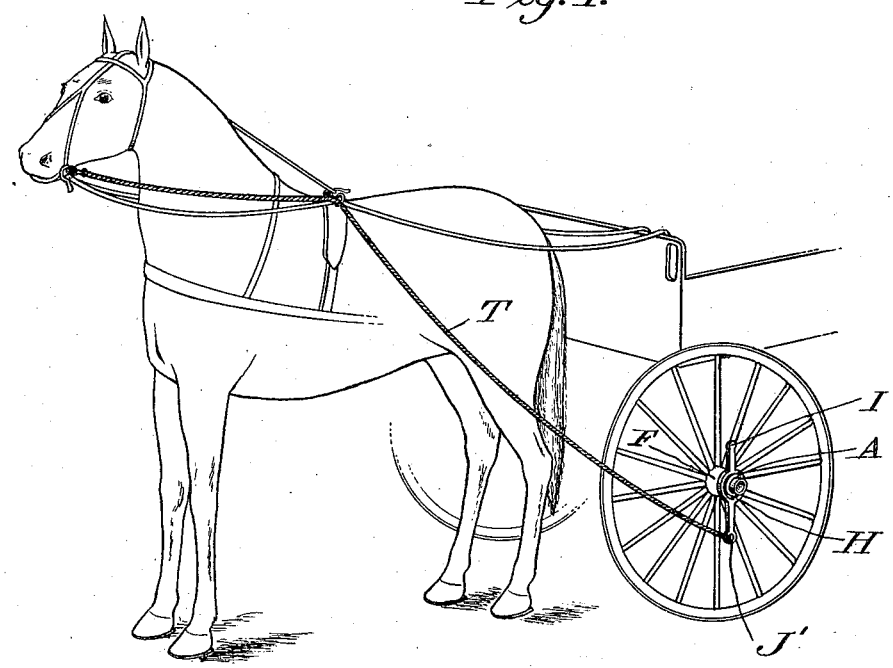
Fig. 1.
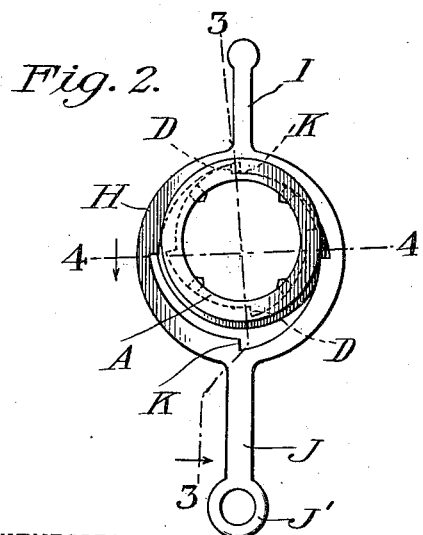
Fig. 2.
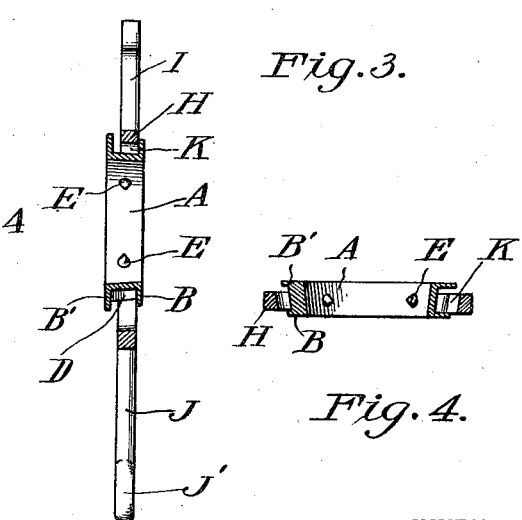
Fig. 3.
Fig. 4.
WITNESSES
Fenton S. Belt
J. N. Sherwood
INVENTOR
C. E. Sullivan
By Franklin N. House
Attorney